United States Patent [19]

Sibley et al.

[11] Patent Number: 5,295,403
[45] Date of Patent: Mar. 22, 1994

[54] MECHANICAL ACTUATOR

[75] Inventors: Richard D. Sibley, Anaheim; William F. Keller, San Dimas, both of Calif.

[73] Assignee: Koso Internationa, Inc., Lancaster, Calif.

[21] Appl. No.: 11,137

[22] Filed: Jan. 29, 1993

[51] Int. Cl.$^5$ .................. G05G 17/00; F16K 31/53
[52] U.S. Cl. .......................... 74/2; 137/38; 137/39; 251/67; 251/73
[58] Field of Search .............. 74/2; 137/38, 39; 251/67, 73

[56] References Cited

U.S. PATENT DOCUMENTS

| | | | |
|---|---|---|---|
| 2,580,596 | 1/1952 | Richardson | 74/2 |
| 4,185,507 | 1/1980 | Domyan | 74/2 |
| 4,475,565 | 10/1984 | Keller et al. | 137/39 |
| 4,503,717 | 3/1985 | Keller et al. | 74/2 |
| 4,513,629 | 4/1985 | Keller et al. | 74/2 |
| 4,603,591 | 8/1986 | Sibley et al. | 74/2 |
| 4,782,848 | 11/1988 | Sibley et al. | 137/38 |
| 4,911,029 | 3/1990 | Banba et al. | 74/2 |
| 4,915,122 | 4/1990 | Ikegaya et al. | 137/38 |

FOREIGN PATENT DOCUMENTS

283437  1/1928  United Kingdom ............... 251/67

Primary Examiner—Allan D. Herrmann
Attorney, Agent, or Firm—William P. Green

[57] ABSTRACT

A device for power actuating a valve or other controlled unit, including a member operable by movement in opposite directions to move the controlled unit to different positions, a spring yieldingly urging the member in one of those directions, and a latching mechanism which is urged by the pressure of a body of fluid to a condition releasably retaining the member against movement by the spring. The latching mechanism is constructed to have a mechanical advantage enabling a relatively small force exerted by the body of fluid to resist a much greater force exerted by the spring. The latching mechanism includes two latching elements which are interengageable to releasably retain the member against movement by the spring, with one of the elements being shiftable in opposite directions by a manual operating member to manually actuate the member and also to vary the position in which the latching mechanism retains the member.

36 Claims, 6 Drawing Sheets

MECHANICAL ACTUATOR

This invention relates to actuators for mechanically operating a controlled unit, such as a valve for closing off the flow of a fluid in response to earthquake or other shock forces.

BACKGROUND OF THE INVENTION

U.S. Pat. No. 4,503,717 issued Mar. 12, 1985 on "Shock Actuated Unit" shows an actuator in which a controlled member is urged in a predetermined direction by a spring or other yielding means, and is releasably retained against movement in that direction by a latching mechanism. The latching mechanism is released automatically when subjected to a shock force of predetermined magnitude, to free the member for spring induced movement which may for example effect closure of a controlled valve. The controlled member is also manually actuable by a hand wheel or other manual operating element, to actuate the valve by hand between its different positions and to vary the position at which the latching mechanism retains the member. The apparatus of that prior Patent includes a differential gear arrangement for adjusting the relationship between the manually operated control element and the other portions of the apparatus.

SUMMARY OF THE INVENTION

The present invention provides an improved mechanical actuator for operating a controlled valve or other unit, and which has been especially designed to maximize its reliability of operation under extremely adverse conditions. A device embodying the invention can for example very positively close a pipeline valve which may have remained untouched, in an open condition, for years before the earthquake or other event occurs which requires closure. Such a valve may be very difficult to operate, and require forces which are of high magnitude but are very effectively and reliably controlled to actuate the valve.

A device embodying the invention preferably includes a member urged in a predetermined direction by a spring or other yielding means, and a latching mechanism for releasably retaining the member against such movement, with the latching mechanism being designed to be actuated to its active holding condition by the pressure of a body of fluid, preferably a liquid, exerting force on the latching mechanism. The mechanism is desirably constructed to introduce a mechanical advantage into the holding action in a relation enabling a relatively small force exerted by the body of fluid to resist a much greater force exerted by the main spring or other yielding means against the controlled member. The latching mechanism may have a camming action tending to cam a latching element from an active position to a retracted position as a result of the force applied by the main spring of the apparatus, but with the camming angle being very small so that the force urging the latch element toward its inactive position is much smaller than the force of the main spring, and can be effectively resisted by a small force applied by the fluid. The latching mechanism may be released by relieving the pressure of the fluid typically automatically upon actuation of a shock responsive unit by earthquake forces.

A further feature of the invention resides in the manner in which the actuator may be operated or adjusted manually. In particular, a manually operated control element may function to shift an element of the latching mechanism between different positions relative to the spring urged member of the device, to vary the position at which the latching mechanism retains that member.

BRIEF DESCRIPTION OF THE DRAWINGS

The above and other features and objects of the invention will be better understood from the following detailed description of the typical embodiment illustrated in the accompanying drawings, in which.

DESCRIPTION OF THE PREFERRED EMBODIMENT

Figure 1:
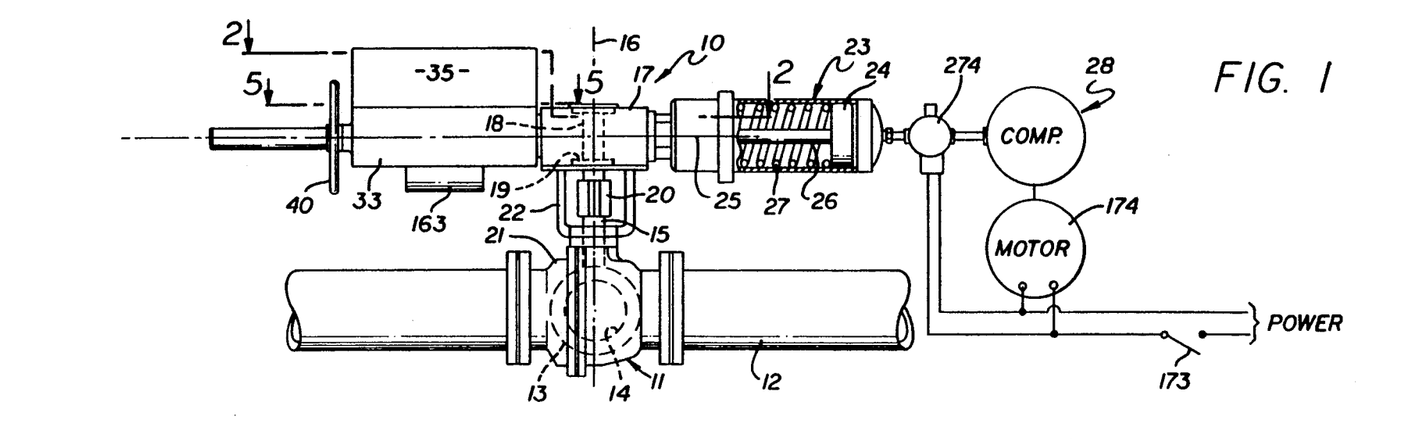
FIG. 1 is a side elevational view of a valve actuator embodying the invention.

The actuator 10 of FIG. 1 is typically illustrated as connected to a valve 11 in a horizontal pipeline 12 through which a fluid to be controlled flows. For example, the pipeline may typically be a gas line whose valve 11 is to be automatically closed in the event of an earthquake. Valve 11 may be a conventional ball valve, having a spherical valve element 13 which contains a passage 14 and is rotatable by a stem 15 about a vertical axis 16 through ninety degrees between an open position in which passage 14 is aligned with pipeline 12 and a closed position in which the passage is disposed transversely of the pipeline to block fluid flow therethrough.

The actuator 10 includes a hollow rectangular central body 17 within which a vertical shaft 18 is journalled by bearings typically represented at 19 for rotation about axis 16, with the lower end of shaft 18 being attached rigidly by a coupling 20 to stem 15 of the valve. Body 17 is rigidly attached to the body 21 of valve 11 by a bracket structure 22.

A cylinder 23 is attached rigidly to the central body 17 of the actuator and projects rightwardly therefrom as viewed in FIG. 1, and contains a piston 24 which is slidably movable within the cylinder along a horizontal axis 25. A cylindrical rod 26 is connected to piston 24 and is centered about and extends along axis 25 and is movable axially with the piston. A coil spring 27 within the cylinder yieldingly urges the piston and piston rod to the position illustrated in FIG. 1, in which position valve 11 is closed. The piston and rod are actuable leftwardly from the FIG. 1 position, against the tendency of spring 27, by high pressure air pumped into the right end of cylinder 23 by a compressor represented at 28 driven by a motor 174.

For converting axial movement of rod 26 to rotary movement of shaft 18 and valve element 13, an arm 30 is connected rigidly to shaft 18 for rotation therewith, and contains a slot 31 within which a pin 32 secured to rod 26 is slidably receivable. Upon leftward movement of rod 26 as viewed in FIG. 2, pin 32 swings arm 30 through ninety degrees from the full line position of FIG. 2 to the broken line position of that figure, with shifting movement of the pin longitudinally within slot 31 as illustrated, to open valve element 13.

Projecting leftwardly from the central body 17, actuator 10 includes a hollow rectangular housing 33 containing a latching mechanism 34 for releasably retaining rod 26 and piston 24 and valve element 13 in the open position of the valve. A hollow rectangular cover 35 closes the upper side of housing 33 and is normally attached thereto by screws or other fasteners, but is illustrated as removed from housing 33 in FIGS. 2, 3, 4 and others of the figures for viewing of the interior mechanism.

Figure 5:
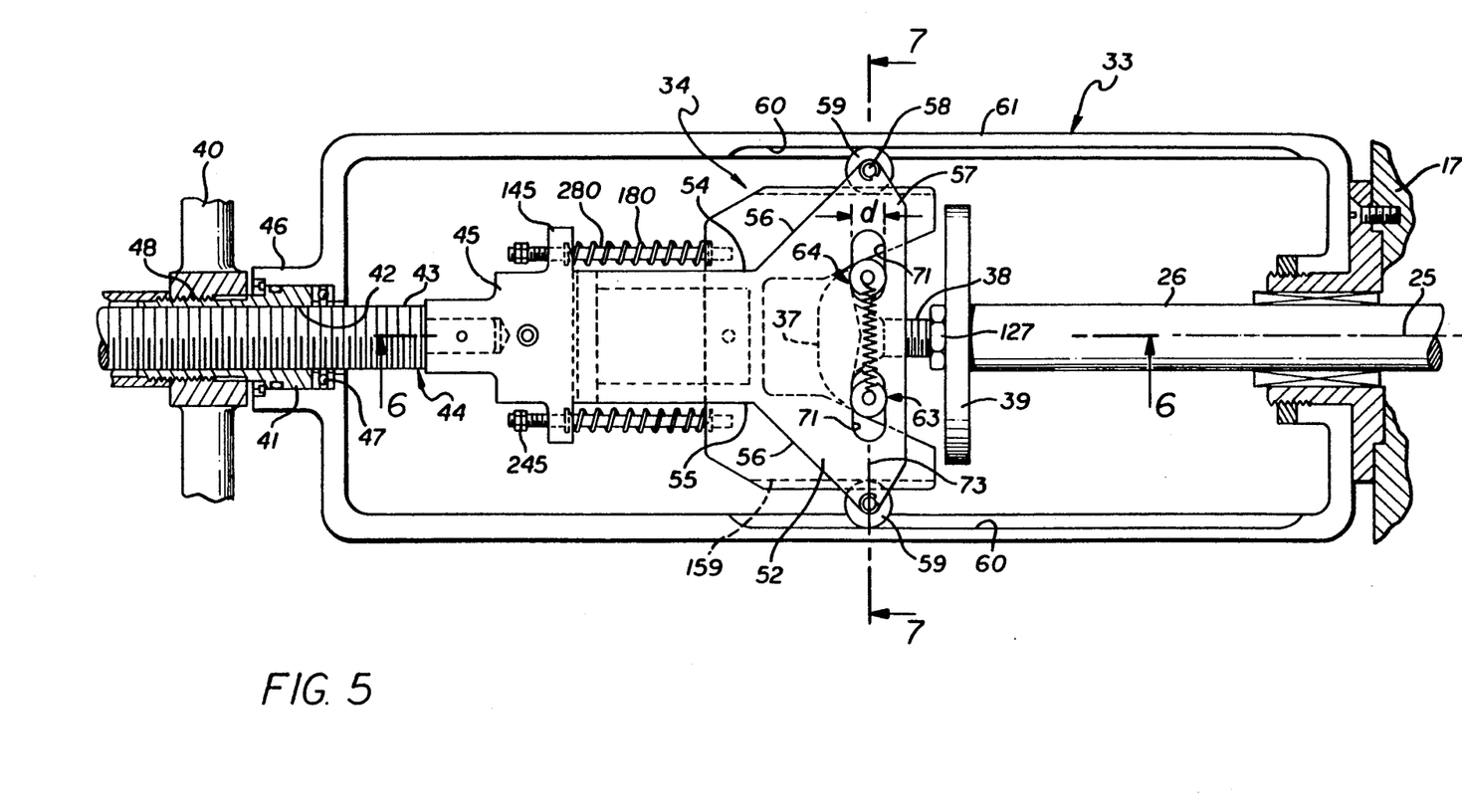
FIG. 5 is an enlarged horizontal section taken on line 5—5 of FIG. 1.

The latching mechanism 34 includes an assembly 36 which is adapted to engage an essentially T-shaped part 37 attached to the left end of the rod 26 to releasably retain part 37 and the connected rod in an open valve position and against rightward movement by spring 27 (see FIG. 5). Part 37 has an externally threaded shaft 38 which is connected into a threaded passage in rod 26, and is retained against removal from rod 26 by a lock nut 127 threaded onto shaft 38. A circular disc 39 is also retained by nut 127 against the end of rod 26, and functions to automatically actuate a certain portion of the apparatus when the parts are in the FIG. 5 condition, as will be discussed in greater detail at a later point.

The assembly 36 is shiftable along axis 25 by manual rotation about that axis of a hand wheel 40 mounted at the left end of housing 33. The hand wheel contains a nut element 41 having an internal thread 42 engaging an external thread 43 on a lead screw 44 connected to a carriage part 45 of assembly 36. Nut 41 is journalled for rotation about axis 25 within a tubular projection 46 of housing 33, and is retained against axial movement relative to housing 33, with rightward forces in FIG. 5 being taken by a thrust bearing 47. The nut is in turn rigidly attached to hand wheel 40 in any appropriate manner, as by connecting these parts together threadedly at 48 and providing a key retaining the parts 40 and 41 against relative rotation. Threads 42 and 43 of the nut 41 and lead screw 43 are centered about axis 25, so that rotation of the hand wheel is effective to shift screw 44 and carriage 45 rightwardly or leftwardly along axis 25 of the actuator.

Figures 6, 6A:
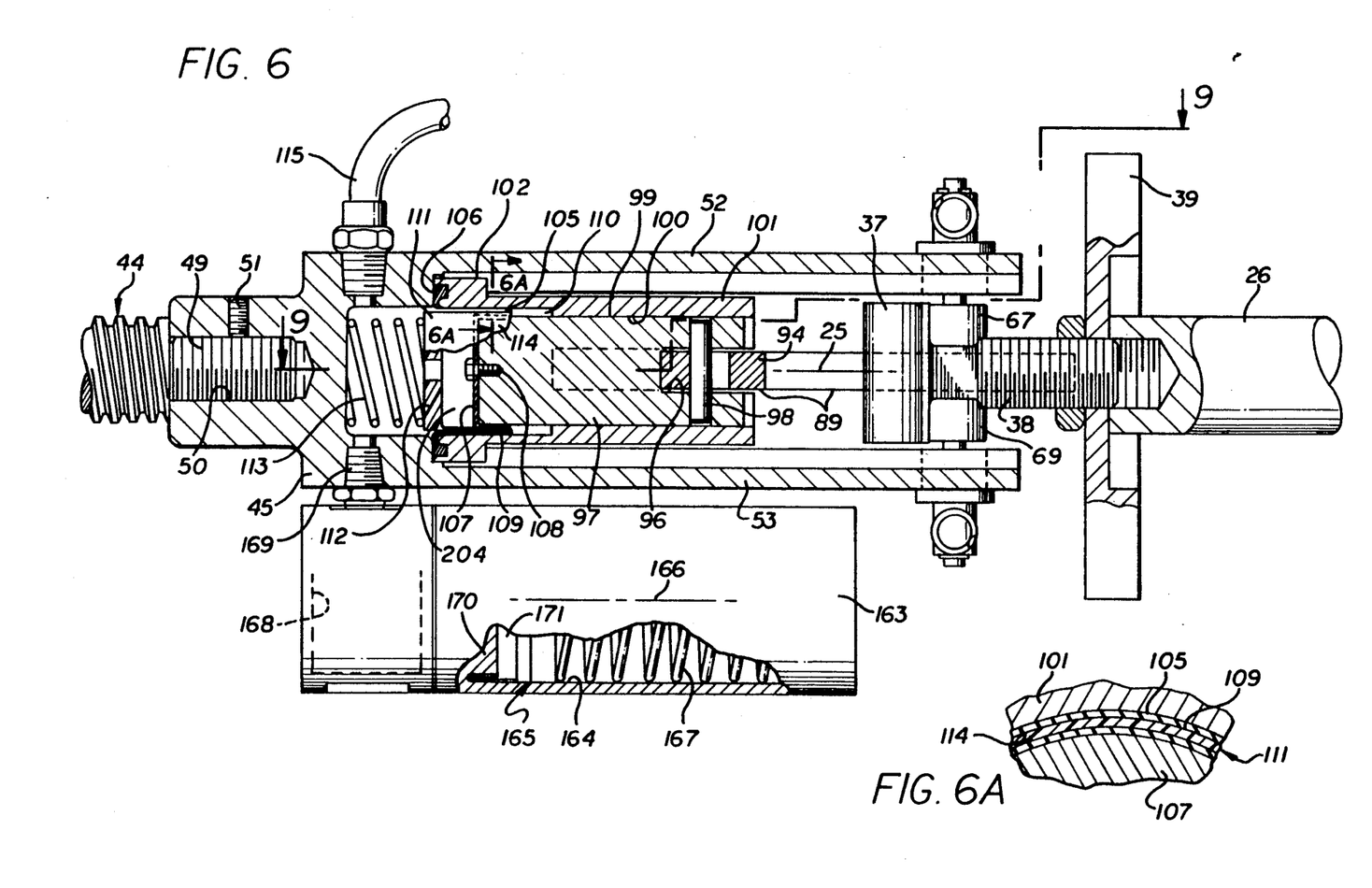
FIG. 6 is a further enlarged fragmentary axial sectional view taken on line 6—6 of FIG. 5.
FIG. 6A is an enlarged fragmentary section taken on line 6A—6A of FIG. 6.

As seen in FIG. 6, screw 44 is attached to carriage 45 by threaded connection of a projection 49 on screw 44 into a passage 50 in the carriage, with a set screw 51 retaining the parts against detachment. Projecting rightwardly from its point of attachment to lead screw 44, carriage 45 forms two vertically spaced similarly shaped upper and lower horizontal plates 52 and 53 (FIGS. 5, 6 and 7), having the horizontal outline configuration illustrated in FIG. 5. More particularly, each of these plates may have two parallel opposite side edges 54 and 55 defining relatively narrow left portions of the plates, and leading to flaring edges 56 defining a wider portion 57 of each of the plates. At their widest portions, the plates 52 and 53 carry vertical pins 58 (FIG. 7), extending between the two plates and carrying rollers 59 vertically intermediate the plates received within guide grooves 60 in the side walls 61 of housing 33 to effectively guide the carriage 45 for only horizontal movement along axis 25. As illustrated, rollers 59 may be of the ball bearing type, with their inner races being retained against upward and downward movement relative to pins 58 by spacer sleeves 62.

Figure 7:
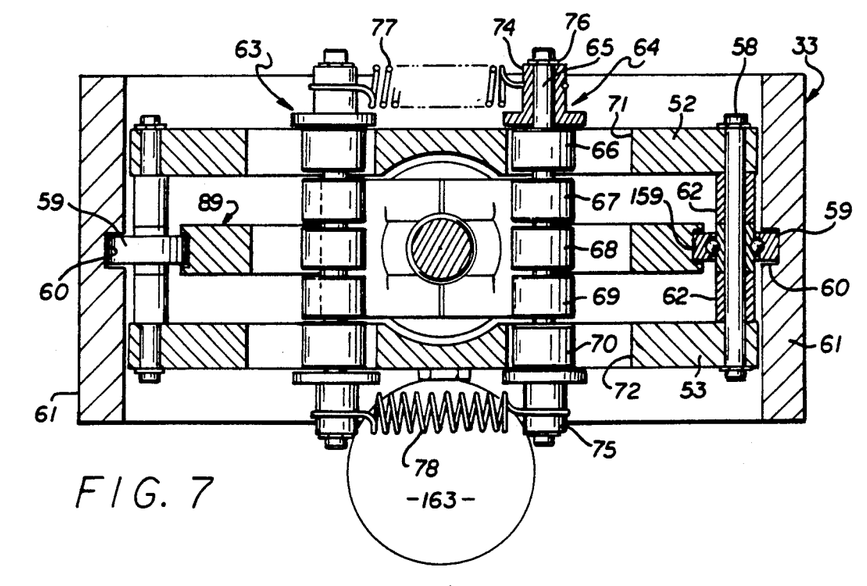
FIG. 7 an enlarged transverse section taken on line 7—7 of FIG. 5.

Two latch units 63 and 64 are connected movably to carriage 45 and its plates 52 and 53 for releasably engaging the previously mentioned part 37 on rod 26 in latching relation. Each of the latching units 63 and 64 includes a vertical shaft 65 carrying five rollers 66, 67, 68, 69 and 70 which are freely rotatable about shaft 65 and are appropriately retained at slightly spaced positions along the shaft as illustrated in FIG. 7. The upper and lower rollers 66 and 70 of each of the latch units 63 and 64 are received within similar horizontally extending slots 71 and 72 in the upper and lower plates 52 and 53 of the carriage. Slots 71 and 72 are elongated transversely of axis 25, and have a dimension d parallel to that axis which is essentially the same as the external diameter of each of the rollers 66 through 70, to retain assemblies 63 and 64 against movement parallel to axis 25 relative to carriage 45 while permitting movement of assemblies 63 and 64 along a transverse axis 73 disposed perpendicular to axis 25. At their upper and lower ends, shafts 65 are received within bushings 74 and 75, which are held on the pins by retaining washers 76 received within grooves in the pins. A coil spring 77 extends between the two bushings 74 at the upper ends of pins 65, and is under tension to normally urge latch assemblies 63 and 64 toward one another and to the positions illustrated in FIG. 7. Similarly, a spring 78 at the underside of the carriage urges bushings 75 relatively together and to the FIG. 7 position.

The two rollers 67 and 69 of each of the latch units 63 and 64 (see FIG. 7) engage part 37 attached to rod 26 to latch the rod in a condition such as that illustrated in FIG. 5. As seen best in FIGS. 9 to 11, part 37 has at its left side a surface 79 which curves gradually rightwardly at 81 and 82 as it extends laterally to the extremities 83 and 84 of part 37. At its right side, part 37 has two camming surfaces 85 and 86 which are engageable with rollers 67 and 69 of the two latch units 63 and 64 respectively in the fully latched positions illustrated in FIG. 11, to retain part 37 and the attached rod 26 against rightward movement. Surfaces 85 and 86 are desirably planar, and each is disposed at a slight camming angle a with respect to a plane 87 perpendicular to the axis 25 of movement of rod 26 and part 37. As a result of this camming angle, rightward force exerted by part 37 against rollers 67 and 69 of the two latch units 63 and 64 tends to cause those latch units 63 and 64 to move relatively apart, but with a spreading force which is much less than the axial force exerted against rod 26 by spring 27. In a presently preferred form of the invention, the camming angle a is eight degrees.

Figure 2:
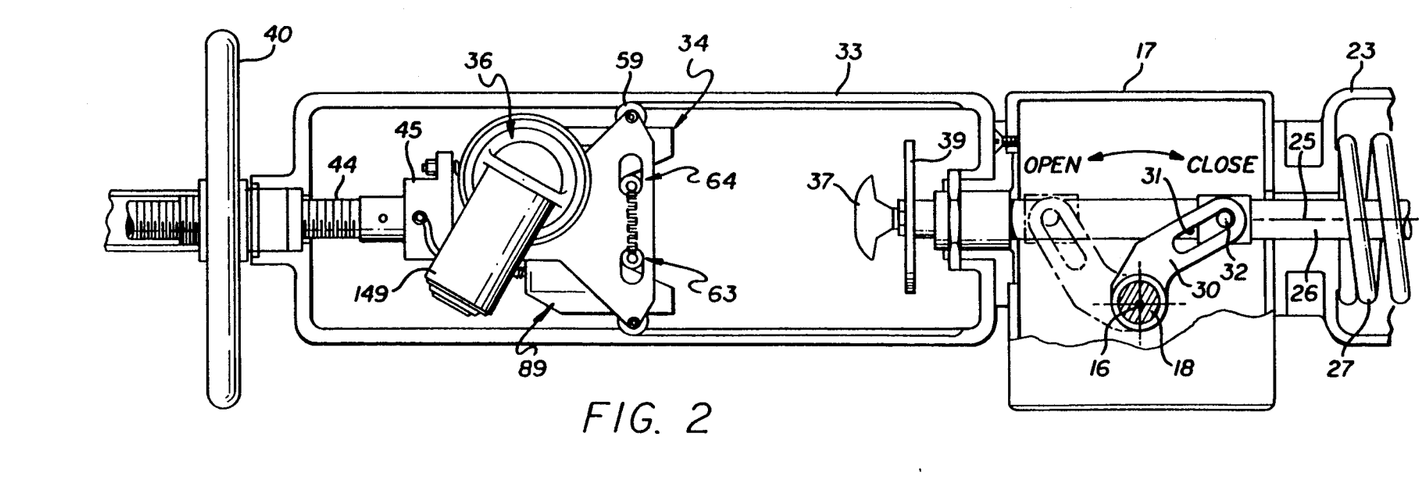
FIG. 2 is an enlarged fragmentary horizontal section taken on line 2—2 of FIG. 1.
Figures 3, 4:
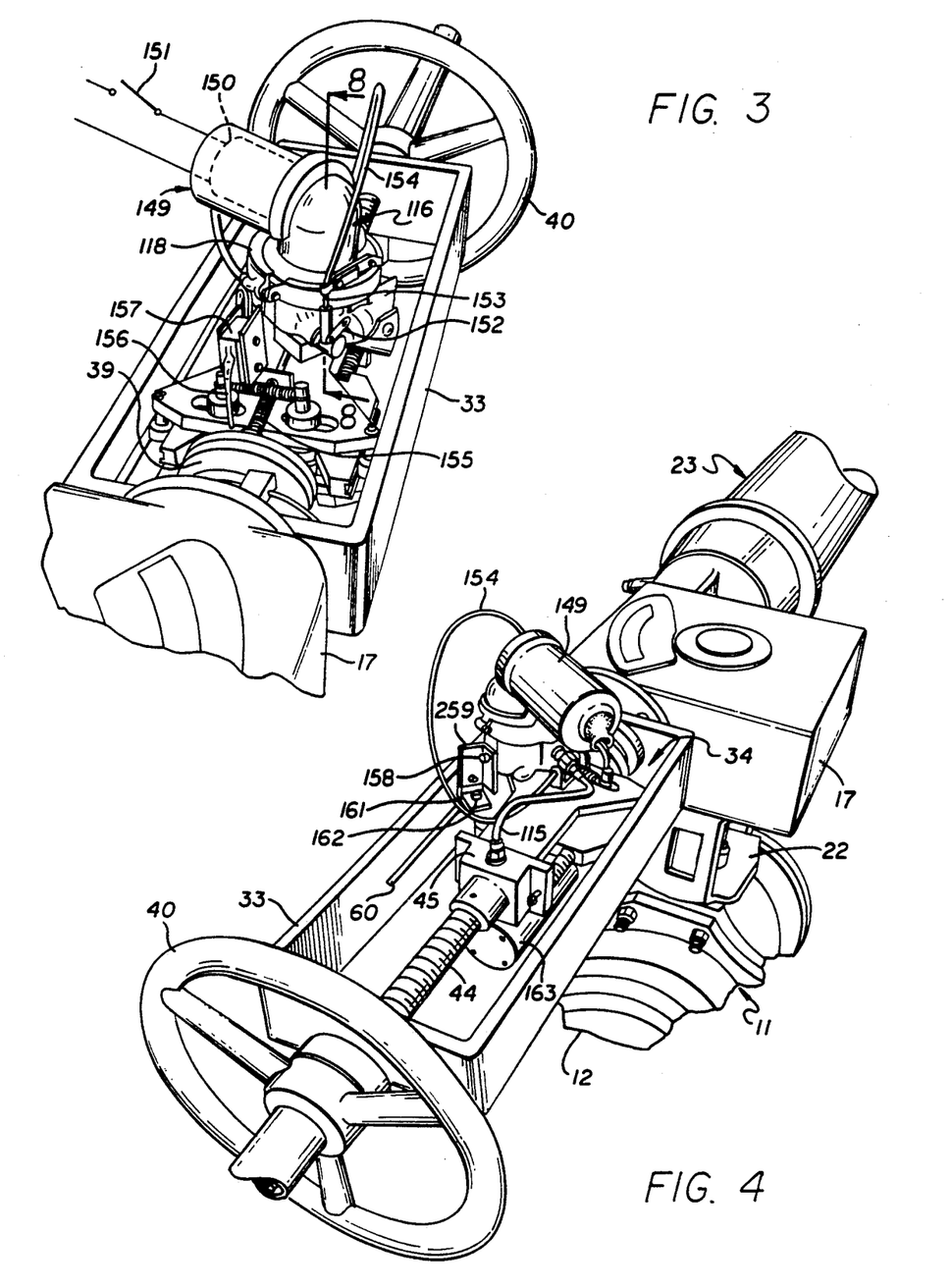
FIG. 3 is a perspective view of a portion of the actuator as it appears looking leftwardly in FIG. 1, and with the cover of the device removed to reveal the inner mechanism.
FIG. 4 is a perspective view of the actuator, with the cover removed, and as the apparatus appears when looking rightwardly in FIG. 1.
Figure 9:
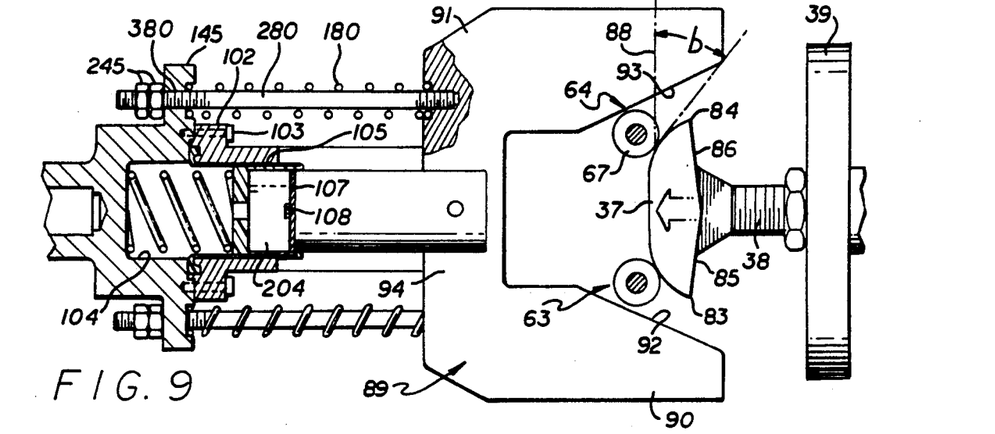
FIGS. 9 and 10 are enlarged fragmentary horizontal sections taken primarily on line 9—9 of FIG. 6 and showing the latching mechanism in two different positions.
Figure 10:
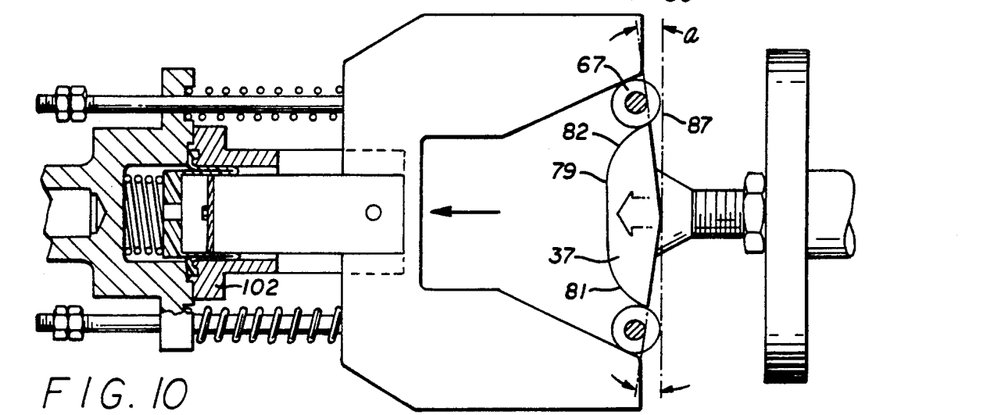
Figure 11:
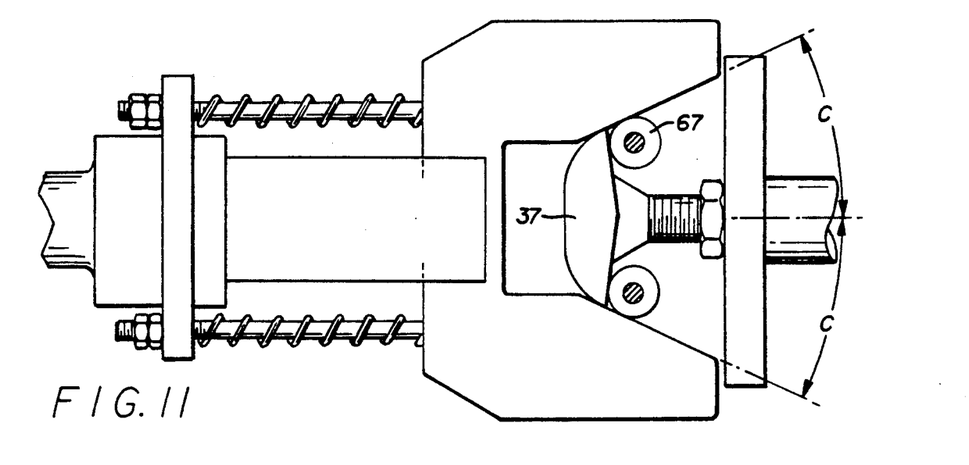
FIG. 11 is a view similar to FIGS. 9 and 10 and showing the latching mechanism in a third fully latched condition, and with the left hand portion of FIG. 11 being shown in elevation rather than in section as in FIGS. 9 and 10.

During latching movement of part 37 and rod 26 leftwardly from the position of FIG. 2 to the position of FIG. 5 as a result of the application of air pressure to the right side of piston 24, the curved surfaces 81 and 82 at the left side of part 37 act to engage rollers 67 and 69 of latch units 63 and 64 and cam those units 63 and 64 laterally apart from the position of FIG. 9 to the position of FIG. 10, enabling part 37 to pass the roller units 63 and 64 and ultimately permit them to move back toward one another to the latched condition of FIG. 11. The FIG. 9 positions of latch units 63 and 64 are the positions in which the upper and lower rollers 66 and 70 of those latch units are in engagement with the inner ends of slots 71, to prevent further movement of units 63 and 64 toward one another. In that closest position of these two latch units, the effective camming angles b of surfaces 81 and 82 of part 37 with respect to a transverse line or plane 88 perpendicular to axis 25 is preferably much greater than the small camming angle a of surfaces 85 and 86. As the rollers of units 63 and 64 spread relatively apart during leftward movement of part 37, this effective camming angle b gradually increases as a result of the curvature of surfaces 81 and 82. Surfaces 81 and 82 can thus cam latch units 63 and 64 relatively apart with the application of a much smaller axial force against part 37 than is required to cam units 63 and 64 apart by the action of surfaces 85 and 86.

Forces exerted by part 37 against latch units 63 and 64 tending to spread those units apart are communicated by units 63 and 64 to a member 89 which takes the form of a U-shaped horizontal plate having the horizontal outline configuration illustrated in FIGS. 9, 10 and 11. This plate 89 is midway between the upper and lower plates 52 and 53 of carriage 45, and has two arms 90 and 91 with camming surfaces 92 and 93 engaging the central rollers 68 of the two latch units 63 and 64. Plate 89 is mounted to carriage 45 for sliding movement relative thereto along axis 25, between the position of FIG. 9 and the position of FIG. 10, and is located and guided for that movement by reception of the previously mentioned rollers 59 of the carriage within guideway grooves 159 in the opposite sides of member 89.

Forces exerted by part 37 tending to spread latch units 63 and 64 relatively apart from their FIG. 9 positions to their FIG. 10 positions act through the engagement of rollers 68 with surfaces 92 and 93 to cam plate 89 leftwardly from the FIG. 9 position to the FIG. 10 position relative to the carriage. This movement is resisted by two coil springs 180 which are under compression between plate 89 and two lugs 145 on carriage 45. These springs are disposed about two rods 280 which are threadedly connected to plate 89 and extend slidably through openings 380 in lugs 145, with rightward movement of plate 89 relative to carriage 45 being limited by engagement of nuts 245 on rods 280 with lugs 145. Surfaces 92 and 93 on plate 89 may be straight and planar as shown, and be disposed at a camming angle c with respect to the axis of relative movement 25 of plate 89 and the carriage. In a presently preferred arrangement, the angle c is 24 degrees The two arms 90 and 91 of plate 89 are joined by a cross piece portion 94 of that plate, which is received within a diametrical slot 96 in a plunger 97, and is secured rigidly to that plunger by a vertical pin 98. Plunger 97 has an external cylindrical surface 99 centered about axis 25 and slidably received within a similarly cylindrical internal surface 100 in a tubular cylinder member 101 carried by carriage 45. Member 101 may have a flange 102, and be rigidly attached to carriage 45 in any suitable manner as by screws represented at 103 in FIG. 9. Leftwardly opposite the cylindrical bore 100 of member 101, the carriage may contain a cylindrical recess 104 forming with member 101 a sealed chamber 204 containing liquid whose pressure is exerted rightwardly against plunger 97.

The fluid chamber 204 may be sealed by a flexible diaphragm cup 105, having an annular outer rim portion 106 which is confined between flange 102 and an opposed surface of the carriage. The central portion of diaphragm 105 is clamped against the left end surface of plunger 97 by a circular disc 107 retained by a screw 108 connected threadedly into the plunger. An annular convolution 109 of the diaphragm is received within an annular groove 110 radially between plunger 97 and member 101 and permits axial movement of the plunger while maintaining the desired fluid seal between the parts. An element 111 may be provided for maintaining the convolution 109 within recess 110, and may be essentially cup shaped in configuration, having a transverse end wall 112 urged rightwardly by a coil spring 113, and carrying a rightwardly projecting cylindrical portion 114 of element 112 extending into groove 110 between two portions of the convolution 109 to maintain that convolution at all times in the desired illustrated configuration.

The pressure of the liquid contained within chamber 204 at the left side of plunger 97 and diaphragm 105 is communicated by a line 115 to a shock responsive unit 116 which automatically relieves the pressure of the liquid when subjected to earthquake forces or other similar shock forces. Unit 116 is basically very similar to the shock responsive actuator shown in applicants' prior U.S. Pat. No. 4,782,848, the disclosure of which is incorporated herein by reference. Similar actuators have been shown in U.S. Pat. Nos. 4,603,591, 4,915,122, 4,513,629, 4,185,507, 4,475,565 and 4,503,717.

The device 116 includes a hollow body 117 having a lower hollow body section 118 and an upper cover 119 secured together in sealed relation by an annular clamp 120. In the cocked position of the device 116, an arm 121 in the housing is retained in the full line position of FIG. 8 by a shock actuated mechanism 122 including a spherical weight 123. A horizontal shaft 124 mounts arm 121 for swinging movement from the full line position of FIG. 8 to the broken line position of that figure under the influence of a spring disposed about shaft 124 and represented at 125.

Figure 8:
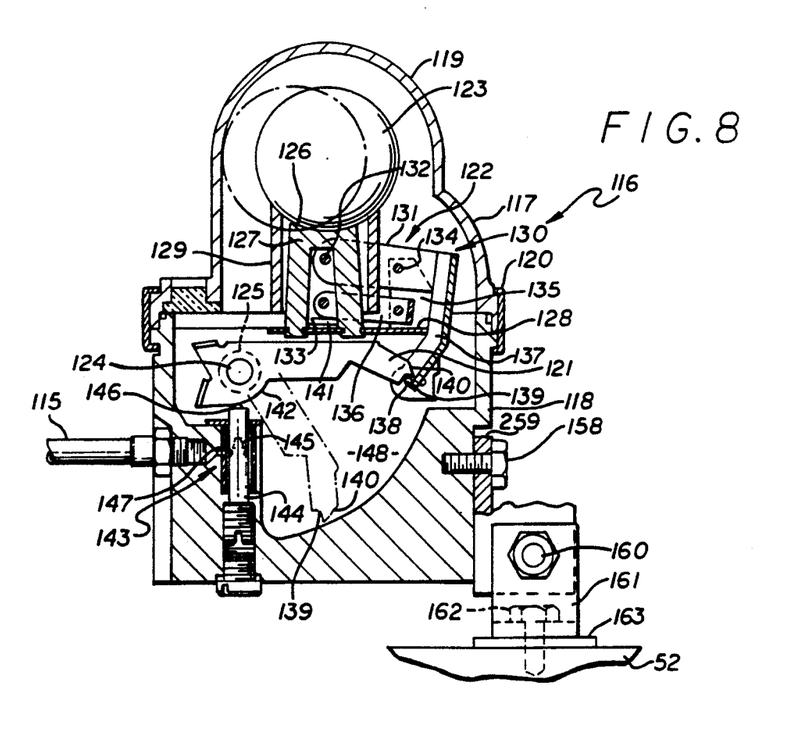
FIG. 8 is a vertical section taken on line 8—8 of FIG. 3.

The weight 123 may be formed of magnetic metal, and in the cocked position of FIG. 8 is supported on the upper concave surface 126 of an upwardly projecting pedestal 127 attached to a horizontal base plate 128 in the housing. The ball is displaceable from its normal centered position on the pedestal, as to the broken line position of FIG. 8, by shock induced movement of the pedestal relative to the ball. A vertical tube 129 disposed about and spaced from pedestal 127 is movable vertically relative to the pedestal. This tube may be mounted for its upward and downward movement by a parallelogram mechanism 130, including two similar parallel upper links 131 each pivoted at one end to the tube by a horizontal pin 132 extending through a vertical slot 133 in pedestal 127, and each pivoted by a second parallel horizontal pin 134 to a pair of bracket arms 135 projecting upwardly from plate 128. Mechanism 130 also includes two similar parallel lower links 136 similarly pivoted to tube 129 and bracket 135. The upper links 131 carry projections 137 which extend downwardly and carry a cross pin 138 receivable within a notch 139 in the end of arm 121 to releasably retain the arm against clockwise swinging movement from the active full line position of FIG. 8. Upon upward swinging movement of arm 121 from the broken line position of FIG. 8 to the full line position of that figure, a cam surface 140 on the arm engages and deflects pin 138 in a manner allowing the arm to pass the pin and permit movement of the pin into a latched position within notch 139. When weight 128 is displaced laterally from the full line position to the broken line position of FIG. 8, the weight displaces tube 129 downwardly relative to pedestal 127 causing rightward swinging movement of pin 138 to release arm 121 for clockwise swinging movement to its broken line position of FIG. 8. The tube is yieldingly urged upwardly by an appropriate spring, typically a leaf spring 141 welded at a central location to plate 128 and applying yielding upward force to tube 129 at diammetrically opposite locations.

When arm 121 swings from its full line position to its broken line position of FIG. 8, a cam surface 142 formed on the inner end of the arm acts to open a valve 143 contained within the lower portion of housing section 118. Valve 143 is preferably of the type conventionally used for filling air into and retaining it within inflatable elements such as automobile tires. More particularly, valve unit 143 includes a tubular body 144 containing a valve element diagrammatically represented at 145 actuable by a vertically movable stem 146. Valve element 145 and its stem 146 are urged upwardly to closed positions by a spring within body 144. At a location beneath valve element 145, the side wall of tubular body 144 contains an opening 147 communicating with the line 115 containing liquid from carriage 45. Cam surface 142 engages the upper end of valve stem 146, to actuate that stem downwardly and open the valve upon swinging movement of arm 121 from the full line position of FIG. 8 to the broken line position of that figure. The inner chamber 148 within housing 117 is at all times filled with liquid up to a level well above the upper end of valve unit 143.

In order to enable release of the latching mechanism under the control of an operator and without subjection of the apparatus to shock forces, a unit 149 may be attached to the side of housing 117 of the shock responsive device 116 for magnetically displacing ball 123 from its FIG. 8 normal position. Unit 149 includes an electromagnet 150 which acts through a non-magnetic wall of cover 119 of the device 116 to attract the ball 123 of magnetic material laterally against the wall of cover 119 and thereby cause downward displacement of tube 129 and the resultant release of arm 121. A magnetic actuator of this type is shown in U.S. Pat. No. 4,475,565, whose disclosure is incorporated herein by reference. An operator energizes electromagnet 150 by closure of a control switch represented diagrammatically at 151 in FIG. 3, to thus displace ball 123 and release the latching mechanism for closure of valve 11.

Arm 121 of the shock responsive unit 116 is adapted to be mechanically reset from the broken line position of FIG. 8 to the full line position of that figure by swinging movement of an arm 152 (FIG. 3) connected pivotally to the exterior of the lower section 118 of housing 117. This arm is mechanically connected by a lost motion connection to arm 121, and is actuable by longitudinal movement of a wire 153 within a cable 154. The second end of the wire 153 is connected to an element 155 which is engaged by disc 39 at the end of shaft 26 when that shaft and the connected disc 39 and part 37 reach the latched position of FIG. 11. Disc 39 also acts in that position to engage an arm 156 of a microswitch 157 acting to automatically deenergize the motor driving air pump 28 (see FIG. 1) and thus halt leftward movement of piston 24 and rod 26.

The housing 117 of shock responsive unit 116 is attached to the upper plate 52 of carriage 45 for movement therewith, and is attached to that plate by a universal connection permitting precise leveling of the unit 116 for proper support of ball 123 on pedestal 127. This universal connection may include a screw 158 attaching one arm of an angle bracket 159 to lower housing section 118 for pivotal adjustment about a first axis, a second screw 160 attaching a second portion of the angle bracket 159 to a vertical portion of a second angle bracket 161 for relative pivotal movement about the axis of that second screw, and a third screw 162 attaching a horizontal portion of the angle bracket 161 to a horizontal plate 163 attached to the upper plate 52 of carriage 45. As will be understood, the three screws 158, 160 and 162 may be loosened slightly to permit leveling of the shock responsive unit by pivotal movement about the three mutually perpendicular axes of these screws, and then be tightened to retain the unit in that level condition.

As seen in FIG. 6, carriage 45 carries at its underside an accumulator cylinder 163 containing a cylindrical bore 164 within which a piston 165 is mounted for horizontal movement along an axis 166. A spring 167 urges piston 165 leftwardly to reduce the size of a chamber 168 which communicates through a fitting 169 with the liquid chamber 204 in the carriage. A flexible diaphragm similar to the diaphragm 105 associated with plunger 97 may seal the chamber 168 in cylinder 163, with the convolution of the diaphragm being urged rightwardly by a cup shaped element and spring of the type shown at 111 and 113 in the upper portion of FIG. 6.

To now describe a cycle of operation of the actuator illustrated in the drawings, assume that initially valve 11 is in closed condition, and that rod 26 and the T-shaped part at its end are in the position of FIG. 2 out of engagement with the shiftable assembly 36 of latching mechanism 34. Assume also that the shock responsive unit of FIG. 8 is in a condition in which its swinging arm 121 is in the broken line position of that figure, so that the cam surface 142 of arm 121 is maintaining valve 143 in open condition to allow free flow of liquid from the interior of unit 116 through valve 143 and line 115 to fluid chamber 204 in carriage 45 and through fitting 169 to the interior of accumulator cylinder 163. The chambers within the accumulator and carriage are both filled with liquid, as is line 115 and the interior of housing 117 of unit 116 up to a level well above the upper end of valve 143. With the apparatus in this condition, the operator closes a switch 173 (FIG. 1) to deliver power to the motor 174 driving air compressor 28, causing the compressor to deliver air to the right end of cylinder 23 resulting in leftward displacement of piston 24 and its connector rod 26 against the resistance of spring 27. The resistance offered by spring 27 is preferably of a very high order to enable the spring when released to apply an extremely high closing force to valve 11 and thereby assure closure of the valve even though it may have become corroded or otherwise stuck in open position. In a presently preferred arrangement, the spring exerts a valve closing force of about one ton.

When the piston and its rod 26 and part 37 at the left end of the rod reach the position illustrated in FIG. 9, the curved camming surfaces 81 and 82 at the left side of part 37 engage rollers 67 and 69 of the two latch units 63 and 64 and deflect those two units 63 and 64 relatively apart toward the positions illustrated in FIG. 10. As the latch units 63 and 64 are spread apart, their central rollers 68 act against cam surfaces 92 and 93 of U-shaped part 89, in a manner camming that part 89 leftwardly from the FIG. 9 position to the FIG. 10 position against the resistance of springs 180. Such leftward movement of member 89 relative to carriage 45 forces the liquid from chamber 204 at the left side of diaphragm 105 through valve 143 into the inner chamber within shock responsive unit 116. As part 37 and the connected elements move leftwardly slightly beyond the position of FIG. 10, the points 83 and 84 at the extremities of part 37 pass beyond the rollers of latching units 63 and 64, permitting those units to return toward one another to the positions of FIG. 11 in which they are in engagement with camming surfaces 85 and 86. This permits member 89 to return rightwardly relative to the carriage to the position of FIG. 11 under the influence of springs 180, with corresponding rightward movement of plunger 99 and the connected portion of diaphragm 105 rightwardly to a position such as that shown in FIG. 9 in which the liquid chamber within the carriage is larger than in FIG. 10. This enlargement of the chamber 204 in the carriage draws liquid back from the interior of the housing of unit 116 past the open valve 143.

After part 37 has reached the FIG. 11 fully latched position, the disc or flange 39 attached to part 37 and rod 26 engages actuator 155 to swing arm 152 of unit 116 in a manner pivoting arm 121 in unit 116 from its broken line position of FIG. 8 to its full line position of that figure, thereby closing valve 143 and preventing further flow of liquid past the valve and into or out of the chamber within the interior of housing 117 of unit 116. As arm 121 reaches the full line position of FIG. 8, it is automatically latched by pin 68 in that full line position. Immediately after such resetting of arm 121 to its full line position of FIG. 8, the flange 39 engages arm 156 of microswitch 157, to open that microswitch and break the circuit to pump motor 174, halting the delivery of air to the right end of cylinder 23.

With the apparatus in this latched condition, the rightward force exerted by spring 27 against piston 24 and rod 26 is resisted by engagement of rollers 67 and 69 of latch units 63 and 64 with cam surfaces 85 and 86 on part 37. Those cam surfaces tend by virtue of their angularity to force latch units 63 and 64 relatively apart from the FIG. 11 position toward a spread condition such as that illustrated in FIG. 10. However, because the camming angle a of surfaces 85 and 86 is very small, the spreading force applied to units 63 and 64 by those cam surfaces is much smaller than the axial force exerted against part 37 by spring 27. The spreading force applied to latch units 63 and 64 acts through rollers 68 of those units and the engaged cam surfaces 92 and 93 of member 89 to urge member 89 leftwardly relative to carriage 45. That leftward movement of member 89 relative to the carriage is however resisted by the liquid contained within chamber 204 at the left side of diaphragm 105, which liquid is trapped against escape by virtue of the previously mentioned closure of valve 143. Because of the mechanical advantage attained by the angularities of camming surfaces 85 and 86 and surfaces 92 and 93, a relatively small reactive or resistive force exerted by the confined liquid within chamber 204 can function to hold latching units 63 and 64 in their FIG. 11 latched condition against the tendency of a very high force applied to member 37 by spring 27. For example, a force of one ton applied by spring 27 and urging rod 26 and part 37 rightwardly in FIGS. 5 and 11 can be effectively resisted by a pressure of only about eighty pounds per square inch in the fluid contained within chamber 204 in the carriage. That small pressure will retain the latching units 63 and 64 in their FIG. 11 latched condition.

When unit 116 senses an earthquake or other shock forces of a predetermined magnitude sufficient to displace the ball 123 laterally onto the upper edge of tube 129, that displacement of the ball causes downward actuation of tube 129 and release of arm 121 to swing to its broken line position of FIG. 8, thereby opening valve 143 and permitting escape of liquid from chamber 204 in the carriage past valve 143 into the interior of housing 117 of unit 116. The resultant escape of liquid from chamber 204 in the carriage removes the resistance to spreading movement of latching units 63 and 64 relatively apart, so that the camming surfaces 85 and 86 of part 37 can force those units 63 and 64 laterally away from one another to a position similar to that illustrated in FIG. 10 permitting rightward movement of part 37 past the latching units and resultant closure of valve 11 by spring 27.

While the extremities 83 and 84 of part 37 are in engagement with rollers 67 and 69, during rightward movement of part 37 past the latching units, there is a momentary rapid increase in the spreading force applied to the latching units by part 37 as a result of the curvature of the roller surfaces contacted by extremities 83 and 84. Stated differently, the high mechanical advantage attained by engagement of the rollers with camming surfaces 85 and 86 is lost, and a greatly increased portion of the axial force of spring 27 is applied to latching units 63 and 64 as a spreading force. This produces a momentary surge in pressure in chamber 204, which is absorbed by rightward movement of piston 165 in accumulator cylinder 163, against the tendency of spring 167. When the pressure in chamber 204 is subsequently reduced, as the latching units return toward their FIG. 9 positions, piston 165 is moved back to the left by spring 167. The pressure in the accumulator in the FIG. 11 latched condition of the apparatus is not great enough to overcome the force of spring 167 of the accumulator and move piston 165 to the right.

During the rightward movement of rod 26 and piston 24, air trapped within cylinder 23 acts to slow the rightward movement of the piston and prevent damage to the apparatus by excessively rapid closure of the valve by the high tension spring 27. The pressure at the right side of the piston 24 can be gradually relieved by an electrically operated three way bleed valve 274 which is connected into the line between compressor 28 and cylinder 23 and is energized by closing of switch 173. When that switch is closed to commence operation of the compressor, valve 274 is actuated to a condition in which it conducts air from the compressor to cylinder 23. When switch 173 is opened to deenergize the compressor, valve 274 is shifted to a second condition in which it can bleed air slowly through a restricted orifice to the atmosphere and thereby slow rightward movement of piston 24 by spring 27 when the latching mechanism is released.

When the latching mechanism 34 is in its latched condition of FIG. 5, with part 37 being retained by latch units 63 and 64 in the condition illustrated in FIG. 11, the valve 11 may be manually opened and closed by rotation of hand wheel 40. Such rotation acts to shift lead screw 44 rightwardly or leftwardly as desired, to correspondingly move the retained rod 26 and piston 24 rightwardly or leftwardly, and thereby rotate shaft 87 to any desired valve setting. Also, such axial shifting movement of screw 44 and the connected carriage 45 and other parts of the assembly 36 can function to change the position at which latching mechanism 34 will hold rod 26, and thus predetermine the extent to which valve 11 will be held open by the latching mechanism.

While a certain specific embodiment of the present invention has been disclosed as typical, the invention is not limited to this particular form, but rather is applicable broadly to

We claim:

1. An actuator comprising:
    a member operable by movement in opposite directions to actuate a controlled unit between different positions;
    means yieldingly urging said member in one of said directions;
    a latching mechanism urged by the pressure of a body of fluid to an active condition releasably retaining said member against movement in said one direction by said yielding means; and
    shock responsive means operable automatically when subjected to shock forces to relieve the pressure of said body of fluid and thereby release said latching mechanism and permit actuation of said member in said one direction by said yielding means.

2. The combination including an actuator as recited in claim 1, and a valve functioning as said controlled unit and adapted to be actuated by said member toward open and closed positions.

3. An actuator as recited in claim 1, in which said latching mechanism is constructed to have a mechanical advantage enabling a relatively small force exerted by the body of fluid to resist a greater force exerted by said yielding means against said member.

4. An actuator as recited in claim 1, in which said latching mechanism includes a latch element and an element engageable thereby to releasably retain said member against movement in said one direction, said elements having camming surfaces tending to urge said latch element from an active position to a released position by force exerted by said yielding means through said member; said camming surfaces being constructed to introduce a mechanical advantage into said latching mechanism enabling a relatively small latching force applied to said latch element and derived from said body of fluid to resist a much greater force applied by said yielding means through said member.

5. An actuator as recited in claim 1, in which said latching mechanism includes a first element carried by and movable with said member, and a latch element engageable with said first element to releasably retain said member against movement in said one direction by said yielding means, one of said elements having a cam surface engaged by the other element in holding relation and disposed generally transversely of said one direction but at a slight camming angle introducing a mechanical advantage into said latching mechanism enabling a relatively small latching force applied by said latch element and derived from said body of fluid to resist a much greater force applied by said yielding means through said member.

6. An actuator as recited in claim 5, in which said cam surface is formed on said first element and said latch element is a roller guided for movement essentially transversely of said first direction and engaging said surface.

7. An actuator as recited in claim 1, in which said latching mechanism includes a latch element movable between an active position retaining said member against movement in said one direction and a released position, and a part urged in a predetermined direction by the pressure of said body of fluid and having a camming relation with said latch element urging it toward said active position in response to movement of said part in said predetermined direction.

8. An actuator as recited in claim 7, in which said latch element is a roller movable generally transversely of said one direction between said active and released positions.

9. An actuator as recited in claim 7, in which said latch element is a roller movable generally transversely of said one direction between said active and released positions, and said part has a camming surface disposed at a camming angle to said one direction and engaged by said roller.

10. An actuator as recited in claim 1, in which said latching mechanism includes a first element movable in accordance with movements of said member and a second element engageable with said first element to retain said member against movement in said one direction; and means for shifting said second element in opposite directions to vary the position in which said latching mechanism releasably retains said member.

11. An actuator as recited in claim 1, in which said latching mechanism includes a latch element and a chamber containing said body of fluid, and means for manually shifting said chamber and the body of fluid and said latch element to vary the position in which the latching mechanism retains said member against movement in said one direction.

12. An actuator comprising:
    a member operable by movement in opposite directions to actuate a controlled unit between different positions;
    means yieldingly urging said member in one of said directions; and
    a latching mechanism urged by the pressure of a body of fluid to an active condition releasably retaining said member against movement in said one direction by said yielding means;
    said latching mechanism including an element connected to said member for movement therewith and having a first cam surface disposed generally transversely of said one direction but at a slight camming angle, a latch unit engageable with said first cam surface to releasably retain said member against movement in said one direction and mounted for movement generally transversely of said one direction between an active latching position and a released position, said first cam surface being disposed at an angle urging said latch unit toward said released position under the influence of force exerted by said yielding means through said member, and a part which has a second cam surface engaged by said latch unit and which is urged by the force of said fluid in a direction to cam the latch unit toward said active position thereof.

13. An actuator as recited in claim 12, including shock responsive means operable automatically when subjected to shock forces to relieve the pressure of said body of fluid and thereby release said latching mechanism and permit actuation of said member in said one direction by said yielding means.

14. An actuator as recited in claim 13, including a carriage which carries said body of fluid and said latch unit and which is shiftable manually in said opposite directions to vary the position in which said latching mechanism releasably retains said member.

15. An actuator as recited in claim 12, including spring means yieldingly urging said part in said direction to cam the latch unit toward said active position thereof.

16. An actuator as recited in claim 15, including spring means yieldingly urging said latch unit toward said active position thereof.

17. An actuator as recited in claim 12, including spring means yieldingly urging said latch unit toward said active position thereof.

18. An actuator comprising:
a member operable by movement in opposite directions to actuate a controlled unit between different positions;
a spring yieldingly urging said member in a first of said directions;
a carriage movable in said opposite directions relative to said member and carrying a confined body of fluid;
a part carried by said carriage for movement therewith and relative thereto and urged by the pressure of said fluid in said first direction relative to the carriage;
an element carried by said member for movement therewith in said opposite directions;
a latching unit connected to said carriage for movement therewith in said opposite directions and for movement relative to the carriage transversely of said opposite directions between an active position engaging said element in a relation holding said element and said member against movement in said first direction by said spring, and a released position;
said element having a first camming surface engaged by said latching unit and disposed generally transversely of said opposite directions but at a slight camming angle acting to urge said latching unit toward released position by the force of said spring;
said part having a second camming surface engaging said latching unit and urging it toward said active position upon movement of said part in said first direction relative to said carriage by the force of said fluid;
said camming surfaces being disposed at angles producing a mechanical advantage enabling a relatively small force exerted by said body of fluid to resist a much greater force applied by said spring to said member; and
a manually operated device for shifting said carriage in said opposite directions to vary the position in which said latching unit holds said member against movement in said first direction.

19. An actuator as recited in claim 18, in which said latching unit includes first and second rollers engaging said camming surfaces of said element and said part respectively.

20. An actuator as recited in claim 18, in which said latching unit includes first and second rollers engaging said camming surfaces of said element and said part respectively, and an additional roller received within a guideway in said carriage to guide the latching unit for said movement transversely of said opposite directions relative to the carriage.

21. An actuator as recited in claim 18, in which said element has two oppositely directed lugs with two of said first camming surfaces, said part being a U-shaped part having two arms with two of said second camming surfaces formed thereon, there being two of said latching units each including a first roller engaging one of said first camming surfaces, a second roller engaging one of said second camming surfaces, and an additional roller received within a slot in said carriage and guided thereby for movement transversely of said opposite directions relative to the carriage.

22. An actuator as recited in claim 18, including shock responsive means operable automatically upon subjection to shock forces to relieve the pressure of said body of fluid and thereby release said member for movement in said one direction by said spring.

23. An actuator as recited in claim 18, including a shock responsive unit carried by said carriage for movement therewith and operable automatically upon subjection to shock forces to relieve the pressure of said body of fluid and thereby release said member for movement in said one direction by said spring.

24. An actuator as recited in claim 18, in which, upon movement of said latching unit from said active position to said released position to permit movement of said member in said first direction, said yielding means act through said member and said element and said latching unit and said part to produce a momentary increase in pressure in said body of fluid; said actuator including an accumulator for receiving some of said fluid during said increase in pressure.

25. An actuator comprising:
a member operable by movement in opposite directions to actuate a controlled unit between different positions;
means yieldingly urging said member in one of said directions; and
a latching mechanism urged by the pressure of a body of fluid to an active condition releasably retaining said member against movement in said one direction by said yielding means;
said latching mechanism including a latch element for releasably retaining said member against movement in said one direction;
said actuator including a screw operable to adjust the position of said latch element in essentially said opposite directions to vary the position at which said latching mechanism releasbly retains said member.

26. An actuator comprising:
a member operable by movement in opposite directions to actuate a controlled unit between different positions;
means yieldingly urging said member in one of said directions;
a releasable latching mechanism including a first element movable in accordance with movements of said member and a second element engageable with said first element to retain said member against movement in said one direction;
means for shifting said second element in opposite directions to vary the position in which said latching mechanism releasably retains said member; and shock responsive means operable automatically when subjected to shock forces to release said latching mechanism and permit movement of said member in said one direction by said yielding means.

27. An actuator as recited in claim 26, in which said shifting means includes an operating member which is actuable manually to move said second element in opposite directions.

28. The combination including an actuator as recited in claim 26, and a valve functioning as said controlled unit and adapted to be actuated by said member toward open and closed positions.

29. An actuator comprising:
a member operable by movement in opposite directions to actuate a controlled unit between different positions;
means yieldingly urging said member in one of said directions;
a releasable latching mechanism including a first element movable in accordance with movements of said member and a second element engageable with said first element to retain said member against movement in said one direction; and
means for shifting said second element in opposite directions to vary the position in which said latching mechanism releasably retains said member;
said shifting means including a screw actuable to move said second element in opposite directions.

30. An actuator comprising:
a member operable by movement in opposite directions to actuate a controlled unit between different positions;
means yieldingly urging said member in one of said directions;
a releasable latching mechanism including a first element movable in accordance with movements of said member and a second element engageable with said first element to retain said member against movement in said one direction; and
means for shifting said second element in opposite directions to vary the position in which said latching mechanism releasably retains said member;
said shifting means including a screw operably connected to said second element, and a hand wheel threadedly engaging said screw and operably by rotation to shift the screw and said second element in opposite directions.

31. An actuator comprising:
a member operable by movement in opposite directions to actuate a controlled unit between different positions;
means yieldingly urging said member in one of said directions;
a releasable latching mechanism including a first element movable in accordance with movements of said member and a second element engageable with said first element to retain said member against movement in said one direction; and
means for shifting said second element in opposite directions to vary the position in which said latching mechanism releasably retains said member;
said latching mechanism including a carriage movable in opposite directions by said shifting means;
said second element being connected to the carriage for movement in opposite directions therewith and for movement relative to the carriage to latch and release said member.

32. An actuator comprising:
a member operable by movement in opposite directions to actuate a controlled unit between different positions;
means yieldingly urging said member in one of said directions;
a releasable latching mechanism including a first element movable in accordance with movements of said member and a second element engageable with said first element to retain said member against movement in said one direction; and
means for shifting said second element in opposite directions to vary the position in which said latching mechanism releasably retains said member;
said latching mechanism including a carriage movable in opposite directions by said shifting means, and a body of fluid carried by and movable with the carriage and resisting release of the latching mechanism.

33. An actuator comprising:
a member operable by movement in opposite directions to actuate a controlled unit between different positions;
means yieldingly urging said member in one of said directions;
a releasable latching mechanism including a first element movable in accordance with movements of said member and a second element engageable with said first element to retain said member against movement in said one direction; and
means for shifting said second element in opposite directions to vary the position in which said latching mechanism releasably retains said member;
said latching mechanism including a carriage movable in opposite directions by said shifting means, and a body of fluid carried by and movable with the carriage and which is pressurized through the latching mechanism by the force of said yielding means, and which urges said second element to an active position retaining said member against movement in said one direction by said yielding means.

34. An actuator as recited in claim 33, in which said shifting means include a screw connected to said carriage for movement in opposite directions therewith, and a manually operated member threadedly engaging said screw and acting to shift it in opposite directions.

35. An actuator as recited in claim 34, including shock responsive means operably automatically upon subjection to shock forces to relieve the pressure of said body of fluid and thereby release said latching mechanism.

36. An actuator comprising:
a member operable by movement in opposite directions to actuate a controlled unit between different positions;
means yieldingly urging said member in one of said directions; and
a latching mechanism urged by the pressure of a body of fluid to an active condition releasably retaining said member against movement in said one direction by said yielding means;
said yielding means acting through said latching mechanism to produce a momentary increase in pressure in said body of fluid when the latching mechanism is released to permit movement of said member in said one direction;
said actuator including an accumulator for receiving some of said fluid during said increase in pressure.

* * * * *